March 14, 1933.   L. M. APPLEGATE   1,901,488
ELECTRIC CIRCUIT PROTECTIVE SYSTEM
Filed April 5, 1930   2 Sheets-Sheet
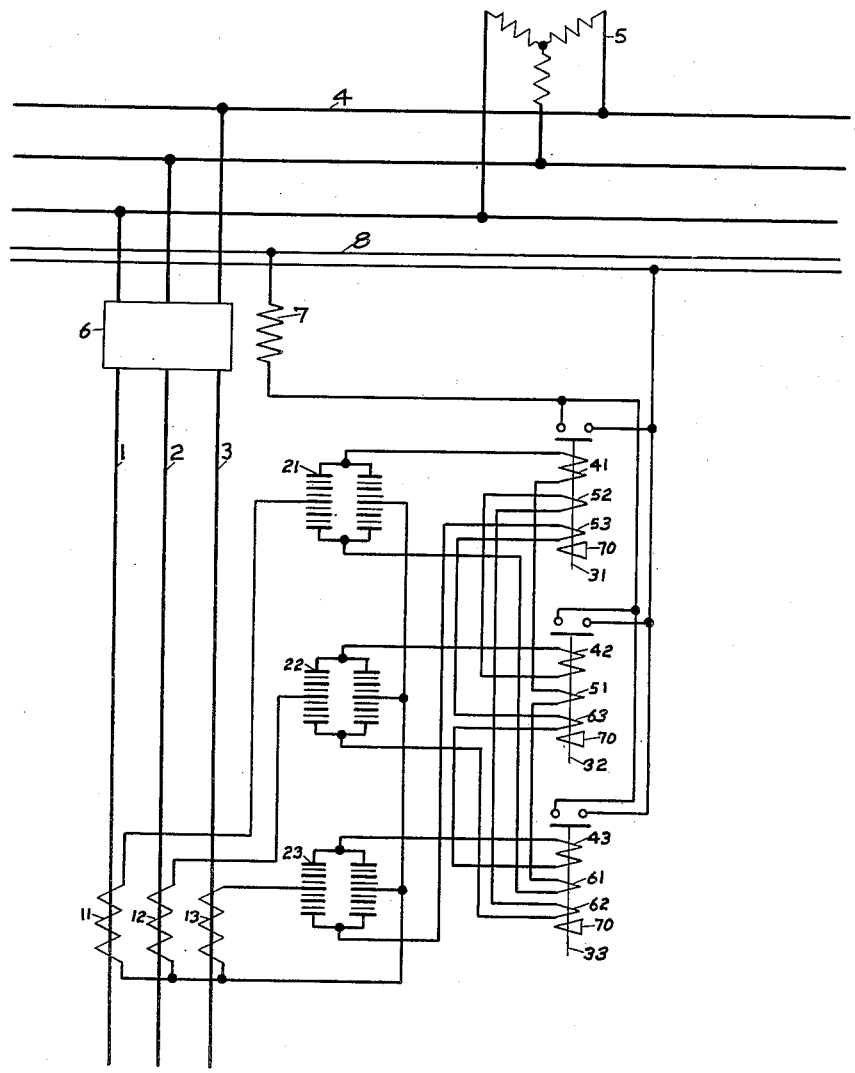
FIGURE I
INVENTOR:
LINDSAY M. APPLEGATE,
BY
ATTORNEYS.

March 14, 1933. L. M. APPLEGATE 1,901,488
ELECTRIC CIRCUIT PROTECTIVE SYSTEM
Filed April 5, 1930 2 Sheets-Sheet 2
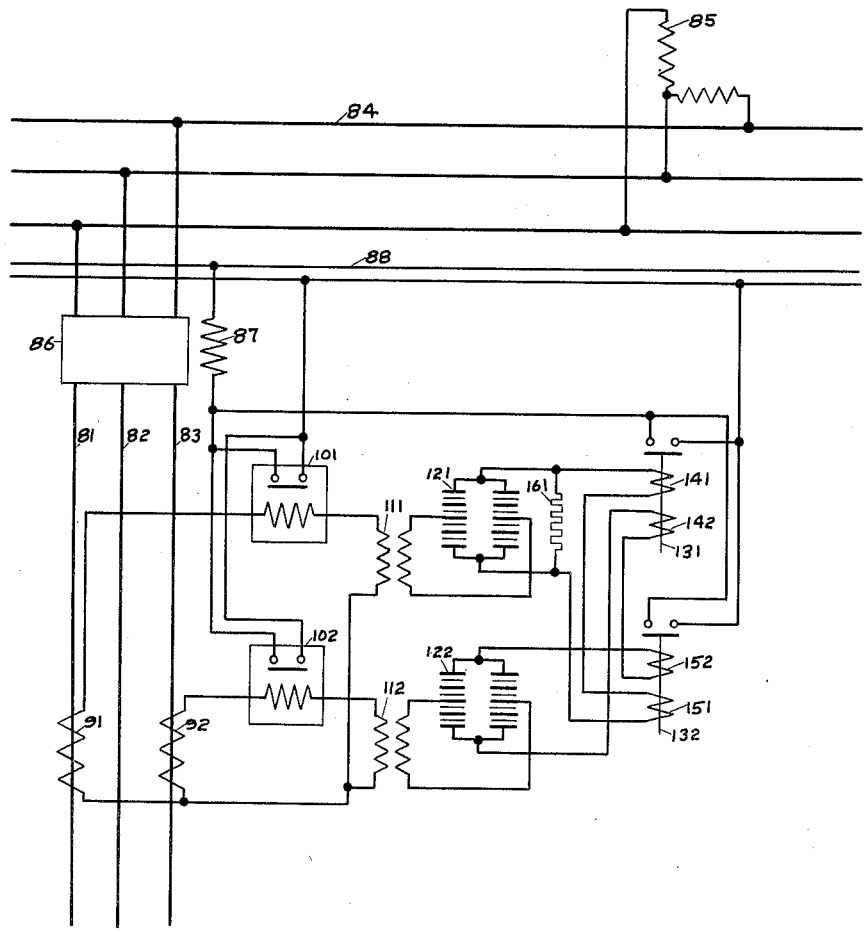
FIGURE II
INVENTOR:
LINDSAY M. APPLEGATE,
BY Atkins & Atkins
ATTORNEYS.

Patented Mar. 14, 1933

1,901,488

UNITED STATES PATENT OFFICE

LINDSAY M. APPLEGATE, OF SEATTLE, WASHINGTON

ELECTRIC CIRCUIT PROTECTIVE SYSTEM

Application filed April 5, 1930. Serial No. 441,962.

This invention relates to the protection of electric circuits. Its purpose is to afford methods of controlling the switching of alternating current circuits by means of instrumentalities, the operation of which depends upon comparison of the magnitudes of currents in the circuit.

In the operation of most polyphase electric circuits it is usually considered that the circuit is normal if the currents in the respective conductors of the various phases are substantially equal, and that inequality of the magnitudes of the currents indicates abnormal conditions, in which the flow of current in the circuit concerned should be interrupted. My invention provides for the automatic detection of inequality of the magnitudes of the phase currents in circuits of this kind, and the operation of appropriate switches by means of relays responsive to the inequality of the current magnitudes.

What constitutes my invention will be disclosed in the specification following and will be succinctly defined in the appended claims.

The features of my invention common to all its applications are those involved in obtaining alternating currents substantially proportional to the circuit currents, rectifying them, comparing their magnitudes, and rendering them effective for the control of switching. The comparison of alternating currents could, perhaps, be done by methods other than those set forth in this specification, but the comparison is greatly facilitated by rectifying the currents to be compared and comparing the unidirectional currents resulting from the rectification. The addition and subtraction of alternating voltages, currents, and fields differing in phase cannot be performed arithmetically, but must be done vectorially. But unidirectional voltages, currents, and fields derived therefrom by rectification can be added or subtracted arithmetically or directly in the same ways as unidirectional voltages, currents, or fields originating from other sources.

In the accompanying drawings which constitute a part of this specification,

Figure I is a diagrammatic view illustrative of my invention as applied to a three-phase circuit.

Figure II is a similar view, showing, for purposes of illustration, my invention as applied to a two-phase circuit.

Reference is hereinafter made to numerals on the several figures.

A form of my invention as applied to a three-phase circuit is shown in Figure I. Energy as three-phase alternating current is delivered to a transmission circuit composed of conductors 1, 2, and 3, by a bus 4 connected with a source of energy 5. Conductors 1, 2, and 3 receive current from the bus 4 through a circuit breaker 6, which is arranged to open when a trip coil 7 is energized. Trip coil 7 receives energy for operation from a control bus 8, through contacts of relays 31, 32, and 33. In connection with conductors 1, 2, and 3, current transformers 11, 12, and 13 deliver alternating current to rectifiers 21, 22, and 23.

Rectifiers 21, 22, and 23 deliver rectified unidirectional currents to coils of the relays 31, 32, and 33. Rectifier 21 delivers unidirectional current to coil 41 of relay 31, coil 51 of relay 32, and coil 61 of relay 33. Rectifier 22 delivers current to coils 42, 52, and 62 of relays 32, 31, and 33, respectively. Rectifier 23 delivers current to coils 43, 53, and 63 of relays 33, 31, and 32, respectively. The coils of relay 31 are arranged so that the effect of the magnetomotive force of coil 41 is equal and opposite to the combined effects of coils 52 and 53 when the currents in the coils are equal. Likewise, in relay 32 the effect of coil 42 is equal to the combined effects of coils 51 and 63, and in relay 33 coil 43 is equal to coils 61 and 62.

In addition to the coils connected to the rectifiers, each of the relays 31, 32, and 33 may have a short circuited coil 70. These assist in maintaining uniform magnetic flux conditions in the relays by compensating for the pulsating character of the unidirectional currents from the rectifiers. The coils 70 may be omitted when the inductance of the circuits through the coils connected to the rectifiers is sufficient to effect satisfactory operation without them.

In operation the circuit conductors 1, 2, and 3 carry substantially equal currents. Current transformers 11, 12, and 13 associated with conductors 1, 2 and 3, respectively, deliver secondary currents proportional to their respective line or primary currents in the usual way. The secondary currents, rectified by the use of any convenient form of rectifiers 21, 22, and 23, preferably of the dry metallic oxide form, because unidirectional currents which, in the normal operating ranges of current and voltage, are substantially equal in effective values to the alternating currents from which they were derived. In each relay the current of one rectifier is compared with the currents of the other two. For example, in relay 31, the current of rectifier 21 corresponding to the current of conductor 1 is compared with the currents of rectifiers 22 and 23.

Since the rectifier currents are equal, the coils must be arranged so that one coil has twice as many conductor turns in it as either of the other two in order for one current to equal the combined effects of the two others.

For example, in relay 31, coil 41 carries the current of rectifier 21. Coils 52 and 53 carry the currents of rectifiers 22 and 23, respectively. The polarities of the coils are arranged so that the magnetomotive forces of coils 52 and 53 are additive, and are opposed by the magnetomotive force of coil 41. Since each coil carries the same value of current, the number of turns in coil 41 must be equal to the total number of turns in coils 52 and 53 or twice the number of either one alone. Similarly, in relay 32, coil 42 is opposed by coils 51 and 63, and in relay 33 coil 43 is opposed by coils 61 and 62. When the currents in all the relay coils are of the same magnitude, the resultant magnetomotive forces in all three relays are zero and the relays' contacts will be open.

In case of abnormal conditions in the conductors 1, 2, and 3, for example, a fault to ground on conductor 1, the current in conductor 1 will increase (assuming that current is flowing from the bus 4), while the currents in conductors 2 and 3 will remain about normal. The current delivered by current transformer 11 and rectified by rectifier 21 will be increased correspondingly. The current through coils 41, 51, and 61 will be increased, while the currents in the other coils will remain about normal. The result will be that in relay 31 the magnetomotive force of coil 41 will exceed the combined forces of coils 52 and 53, and the relay will close its contacts. In the relays 32 and 33 the magnetomotive forces will be unbalanced due to the increased current in coils 51 and 61, respectively, although by a smaller amount than in relay 31.

If abnormal conditions result in a short circuit between two conductors, for example 1 and 2, the currents in conductors 1 and 2 will both be increased, while the current in conductor 3 usually will not be increased, but will remain about normal or, possibly, will decrease. The result will be that the currents in relay coils 41, 51, 61, 42, 52, and 62 will be increased and the current in coils 43, 53, and 63 will remain at normal value or less.

In relay 33, with the coils 61 and 62 each carrying more current than coil 43, the combined magnetic effect of coils 61 and 62 will be greater than that of coil 43, so relay 33 will operate and close its contacts. In relay 31 the current in coils 41 and 52 will be increased, but since coil 41 has twice as many turns as coil 52 the increase in the magnetic effect of coil 41 will be greater than that of coil 52, causing unbalance to exist between coils 41, 52, and 53, thus closing the relay contacts. The action in relay 32 will be similar to that of relay 31.

In the event of a symmetrical or balanced three-phase overload on conductors 1, 2, and 3, current in all three conductors will be increased uniformly, and balanced conditions in relays 31, 32, and 33 will be maintained. Under actual working conditions, most circuit faults result in relatively large inequality in the magnitudes of the phase currents of the particular circuit concerned, whereas, in circuits connected thereto but not in fault themselves, there is some inequality of phase currents, but it is usually much less. For this reason, it is desirable to design relays 31, 32, and 33 so that their contacts will not be closed for very small degrees of current inequality, but will be closed for predetermined degrees of inequality found from observation to be immediately associated with circuit faults.

This method of protection can be used advantageously in conjunction with other methods of protection as now practiced in the art. In using my invention with others, the limitations of design make desirable arrangements such as the one illustrated in Figure II. Figure II shows my invention applied, for purposes of illustration, to a two-phase circuit composed of conductors 81, 82, and 83 connected with a source of energy 85 through a bus 84 and a circuit breaker 86, which is arranged to open when a trip coil 87 is energized from a control bus 88 through the contacts of relays 131 and 132. The general operating features of the arrangement shown in Figure II are similar to those described for that of Figure I, except that in Figure II a two-phase circuit is used, and only two of the conductors are concerned in the current comparison arrangement. It is considered that under normal conditions the current in conductor 81 is equal to that in conductor 82, and that the magnetomotive force of coil 141 will equal that of coil 142 in relay 131, and similarly coil 151 will equal coil 152 in relay 132.

In connection with conductors 81 and 82, two current transformers, 91 and 92, are used to deliver secondary alternating currents proportional to the conductor currents. In connection with transformers 91 and 92, two protective instrumentalities 101 and 102 are provided, such, for example, as the ordinary overload relays used in many circuits. Two rectifiers 121 and 122, instead of being connected directly to transformers 91 and 92, receive energy through two additional current transformers 111 and 112.

These transformers are used because the design of the rectifiers 121 and 122 is usually improved by having the rectifier current of a magnitude different from that of the current used for instrumentalities 101 and 102. For example, the ordinary overload relay is designed to operate on a current of five amperes, while most rectifiers suitable for use in my invention can be designed more economically to operate on about 0.5 ampere. Under such conditions the current transformers 111 and 112 should have a ratio of approximately 10 to 1.

In the operation of the arrangement shown in Figure II, a fault between conductors 81 and 82 or 81 and 83, or between all three, that results in the currents in conductors 81 and 82 being different will cause the currents in rectifiers 121 and 122 to be different, and, accordingly, the magnetomotive forces of coils 141 and 151 will be different from those of coils 142 and 152, and hence will cause the relays to close their contacts, energizing trip coil 87 and opening circuit breaker 86.

It will be observed that in Figures I and II, one relay has been supplied for each phase. The number of coils on each relay is likewise the same as the number of phases. In each instance, one coil of each relay is opposed by the other coils of the relay. In a two-phase system, each relay has two equal and opposed coils. In a three-phase system, each relay has one large coil opposed by two smaller coils, each with half the number of turns of the larger coil. The relationship of the number of turns in the large coil to the number of turns in each of the smaller coils is found by dividing the number of turns in the larger coil by the number of smaller coils. Since there is one coil in each relay for each phase the number of smaller coils in each relay is $p-1$, where $p$ is the number of phases. The number of turns in the smaller coils is therefore the number of turns, $n$, in the larger coil divided by $p-1$. For a two-phase arrangement, the number of turns in each coil is $$\frac{n}{p-1} = \frac{n}{1}.$$

For a three-phase arrangement the number of turns in the larger coil is $n$ and in the smaller coils $$\frac{n}{p-1} = \frac{n}{3-1} = \frac{n}{2}.$$

The same equation can, of course, be applied for any number of phases, as long as one coil is provided in each relay for each phase, which is the preferable arrangement. If the number of coils in each relay is different from the number of phases, $p$ in the above equation should be the number of coils in each relay.

In some applications of my invention the normal phase currents may not be equal, or individual pieces of apparatus may not perform equally on equal currents. In such instances an adjustable resistor 161 in parallel with some of the relay coils will permit the necessary adjustment.

What I claim is:

1. An electric system comprising a polyphase circuit, means for obtaining a unidirectional current proportional to each of the phase currents of said polyphase circuit, and relays each having a single magnetic circuit and a plurality of coils operatively arranged on said single magnetic circuit, the system being arranged so that the operation of said relays will be a function of the inequalities of said phase currents.

2. An electric system comprising a contact operating relay having a single magnetic circuit, and a plurality of coils, each of said coils being a part of a circuit containing an asymmetric cell connected to one phase of a polyphase electric circuit, the system being arranged so that said relay operates its contacts when the currents of said polyphase circuit become unequal.

3. A protective relay system for polyphase alternating current systems which consists of means for causing the flow of unidirectional currents which are substantially proportional to the respective phase currents in said A. C. system, and means for causing said unidirectional currents to coact in contact operating relays arranged to operate their contacts when the phase currents in said A. C. system become unequal.

4. An electric protective system comprising contact operating relays each having a single magnetic circuit and a plurality of coils, said coils being connected to asymmetric cells receiving current from a polyphase circuit, said system being arranged so that said coils carry unidirectional currents which are substantially proportional to the currents of said polyphase circuit, said relays operating their contacts when the currents of said polyphase circuit become materially unbalanced.

5. An electric protective system which, in connection with a polyphase system, consists of means for obtaining alternating currents from each phase of said polyphase system proportional to the respective phase currents, means for rectifying said alternating currents, and relays having single magnetic circuit for comparing said rectified currents with each other, said relays being capable of causing inequality of said rectified currents to control switching in said polyphase system.

In testimony whereof, I have hereunto set my hand.

LINDSAY M. APPLEGATE.